US006718386B1

(12) United States Patent
Hanfland

(10) Patent No.: US 6,718,386 B1
(45) Date of Patent: Apr. 6, 2004

(54) METHODS, SYSTEM, AND ARTICLE FOR DISPLAYING PRIVILEGE STATE DATA

(76) Inventor: Mark Joseph Hanfland, 2133 Lamplight Dr., Marietta, GA (US) 30062

( * ) Notice: Subject to any disclaimer, the term of this patent is extended or adjusted under 35 U.S.C. 154(b) by 531 days.

(21) Appl. No.: 09/618,311

(22) Filed: Jul. 18, 2000

(51) Int. Cl.[7] ............................................. G06F 15/173
(52) U.S. Cl. ........................ 709/225; 709/229; 709/246
(58) Field of Search ................................. 709/225, 224, 709/223, 229, 246; 713/201; 345/440, 440.1, 440.2, 653, 700

(56) References Cited

U.S. PATENT DOCUMENTS

| | | | | |
|---|---|---|---|---|
| 5,312,478 A | | 5/1994 | Reed et al. .................. | 395/148 |
| 5,313,229 A | * | 5/1994 | Gilligan et al. ............. | 345/157 |
| 5,317,686 A | | 5/1994 | Salas et al. .................. | 395/157 |
| 5,359,724 A | | 10/1994 | Earle .......................... | 395/425 |
| 5,592,666 A | | 1/1997 | Perez ........................... | 395/600 |
| 5,729,659 A | * | 3/1998 | Potter .......................... | 704/270 |
| 5,774,878 A | | 6/1998 | Marshall ....................... | 705/35 |
| 5,848,425 A | | 12/1998 | Lowry et al. ............... | 707/503 |
| 5,883,623 A | | 3/1999 | Cseri ........................... | 345/335 |
| 5,910,804 A | | 6/1999 | Fortenbery et al. ......... | 345/419 |
| 5,943,677 A | | 8/1999 | Hicks .......................... | 707/205 |
| 5,978,796 A | | 11/1999 | Malloy et al. ................. | 707/3 |
| 6,005,571 A | | 12/1999 | Pachauri | |
| 6,054,987 A | * | 4/2000 | Richardson ................. | 345/734 |
| 6,336,138 B1 | * | 1/2002 | Caswell et al. ............. | 709/223 |

FOREIGN PATENT DOCUMENTS

EP            0957424 A2    11/1999

OTHER PUBLICATIONS

"3–Dimensional Mouse" IBM Technical Disclosure Bulletin, IBM Corp. New York, US; vol. 36, No. 8, Aug. 1, 1993, pp. 171–173, p. 171, Paragraphs 1, 2, Figure 1.

\* cited by examiner

*Primary Examiner*—Mehmet B. Geckil
(74) *Attorney, Agent, or Firm*—Morris, Manning & Martin, LLP

(57) ABSTRACT

A method of the invention comprises generating a display of privilege state data for a network system in a three-dimensional view. The privilege state data can include graphical symbols indicating "on", "inherited on", "public on", "off", "not set", and "disabled" states. The display can include at least one privilege label, object label, and user label arranged along respective axes of the three-dimensional view. The privilege state data can be displayed one or more cells arranged in association with respective privilege label(s), object label(s), and user label(s). The privilege label identifies at least one privilege, the object label identifies at least one object associated with the privilege, and the user label identifies at least one user or group of users associated with the object. The privilege labels can identify data access, data view, and data flow privileges to access or transfer data pertaining to the object within or without the network system. The privilege labels can also identify use privileges to use one or more software components. The object labels can identify one or more data objects stored in a database accessible by the network system, or one or more software components. The user labels can identify at least one user and/or user group. The invention also includes additional methods, a network system, and an article of manufacture.

7 Claims, 16 Drawing Sheets

USER_TABLE

| USER_ID | PARENT_GROUP_ID | OBJECT | PRIVILEGE | STATE |
|---------|-----------------|--------|-----------|-------|
| JoeUser | CEO | AdamCriteria | Read<br>Write<br>••• | Off<br>Off<br>••• |
| | | AdamLog | Read<br>Write<br>••• | No Value<br>No Value<br>••• |
| | | Addresses | Read<br>Write<br>••• | No Value<br>No Value<br>••• |
| | | Aministration | Read<br>Write<br>••• | No Value<br>No Value<br>••• |

FIG. 7

| GROUP_TABLE | | | | |
|---|---|---|---|---|
| GROUP_ID | PARENT_GROUP_ID | OBJECT | PRIVILEGE | STATE |
| PUBLIC | NONE | AdamCriteria | Read<br>Write<br>⋮ | No Value<br>No Value<br>⋮ |
| | | AdamLog | Read<br>Write<br>⋮ | On<br>On<br>⋮ |
| | | Addresses | Read<br>Write<br>⋮ | No Value<br>No Value<br>⋮ |
| | | Aministration<br>⋮ | Read<br>Write<br>⋮ | No Value<br>No Value<br>⋮ |
| DEFAULT | NONE | AdamCriteria | Read<br>Write<br>⋮ | No Value<br>No Value<br>⋮ |
| | | AdamLog | Read<br>Write<br>⋮ | On<br>On<br>⋮ |
| | | Addresses | Read<br>Write<br>⋮ | No Value<br>No Value<br>⋮ |
| | | Aministration<br>⋮ | Read<br>Write<br>⋮ | No Value<br>No Value<br>⋮ |
| CEO | NONE | AdamCriteria | Read<br>Write<br>⋮ | No Value<br>No Value<br>⋮ |
| | | AdamLog | Read<br>Write<br>⋮ | No Value<br>No Value<br>⋮ |
| | | Addresses | Read<br>Write<br>⋮ | On<br>On<br>⋮ |
| | | Aministration<br>⋮ | Read<br>Write | On<br>On |

FIG. 8

PRIVILEGE_DEPENDENCY_TABLE

| PRIVILEGE | DEPENDENT PRIVILEGE |
|---|---|
| READ | WRITE, CREATE, DELETE |
| WRITE | READ, CREATE, DELETE |
| CREATE | READ, WRITE, DELETE |
| DELETE | READ, CREATE, CREATE |
| ... | ... |

FIG. 10

| USER/GROUP_ID | USER_TABLE OBJECT | PRIVILEGE | STATE |
|---|---|---|---|
| PUBLIC | ADAMCRITERIA | READ<br>WRITE<br>⋮ | NOT SET (OFF)<br>NOT SET (OFF)<br>⋮ |
|  | ADAMLOG | READ<br>WRITE<br>⋮ | PUBLIC ON<br>PUBLIC ON<br>⋮ |
|  | ADDRESSES | READ<br>WRITE<br>⋮ | NOT SET (OFF)<br>NOT SET (OFF)<br>⋮ |
|  | ADMINISTRATION<br>⋮ | READ<br>WRITE<br>⋮ | NOT SET (OFF)<br>NOT SET (OFF)<br>⋮ |
| DEFAULT | ADAMCRITERIA | READ<br>WRITE<br>⋮ | NOT SET (OFF)<br>NOT SET (OFF)<br>⋮ |
|  | ADAMLOG | READ<br>WRITE<br>⋮ | ON<br>ON<br>⋮ |
|  | ADDRESSES | READ<br>WRITE<br>⋮ | NOT SET (OFF)<br>NOT SET (OFF)<br>⋮ |
|  | ADMINISTRATION<br>⋮ | READ<br>WRITE<br>⋮ | NOT SET (OFF)<br>NOT SET (OFF)<br>⋮ |
| CEO | ADAMCRITERIA | READ<br>WRITE<br>⋮ | NOT SET (OFF)<br>NOT SET (OFF)<br>⋮ |
|  | ADAMLOG | READ<br>WRITE<br>⋮ | PUBLIC ON<br>PUBLIC ON<br>⋮ |
|  | ADDRESSES | READ<br>WRITE<br>⋮ | ON<br>ON<br>⋮ |
|  | ADMINISTRATION<br>⋮ | READ<br>WRITE<br>⋮ | ON<br>ON<br>⋮ |
| JOEUSER | ADAMCRITERIA | READ<br>WRITE<br>⋮ | OFF<br>OFF<br>⋮ |
|  | ADAMLOG | READ<br>WRITE<br>⋮ | PUBLIC ON<br>PUBLIC ON<br>⋮ |
|  | ADDRESSES | READ<br>WRITE<br>⋮ | INHERITED ON<br>INHERITED ON<br>⋮ |
|  | ADMINISTRATION<br>⋮ | READ<br>WRITE<br>⋮ | ON<br>ON<br>⋮ |

METHODS, SYSTEM, AND ARTICLE FOR DISPLAYING PRIVILEGE STATE DATA

FIELD OF THE INVENTION

1. Background of the Invention

This invention relates to methods, a system, and an article for displaying privilege state data indicating the privileges of users or groups of users to use different objects supported by a network environment, for example. Such objects can include data or software components. In addition, the method, apparatus, and article can have the capability to receive and set privilege state data defining use privileges of objects for various users or groups of users.

2. Description of the Related Art

In most network environments, the users or groups of users have varying privileges with respect to objects supported by the network. The privileges are generally controlled by a system administrator that uses an application program to set privilege states for all users or groups of users with respect to the objects. For example, in a particular organization, it may be desirable that a user group of corporate officers have access to accounting data supported by the network system, but that other users such as quality control personnel not have access to such information. Such privileges can be set by appropriate definitions of the two groups and privilege settings with respect to the accounting data using the application program. Generally, a different application program running on a network server uses the privilege state settings to enforce restrictions on privileges of the network objects for different users or groups of users.

The complexity of the privilege state data scales rapidly upward with increasing numbers of objects, privileges associated with the objects, and users or user groups on the network system, and therefore administration of privilege states becomes increasingly difficult. In addition, updating of the privilege states is required with changes in the users or users groups, objects, and privileges associated with the objects. Complexity of privilege states is further increased by the fact that some users or groups may "inherit" privilege rights from other groups of which they are members. In previous application programs of this nature, the display of privilege state data is generally done in a manner that makes it relatively difficult to understand which users have privilege rights to which objects, and the derivation of those privilege rights, e.g., whether through direct settings or through inheritance. Therefore, setting privilege states as they should be or debugging improper settings is generally relatively difficult with such application programs. It would be desirable to provide methods, a system, and an article that have the capability to display privilege state data in a readily comprehensible manner. In addition, it would be desirable to provide methods, a system, and an article that have the capability to permit privilege state settings to be readily made. Furthermore, it would be desirable to provide methods, a system, and an article that can be used to generate a display that readily permits comprehension of privilege states.

SUMMARY OF THE INVENTION

The invented methods, system and article have as their objects to overcome the abovestated problems with previous devices and techniques, and do in fact overcome such problems and provide significant advantages over the prior art.

A first method of the invention comprises generating a display of privilege state in a three-dimensional view. The privilege state data can be used to indicate the privileges of users or groups of users with respect to an object such as data or a software component accessible by such user or group of users. The privilege state data can be represented by graphical symbols indicating "on", "inherited on", "public on", "off", "not set", and "disabled" states. The display can include at least one privilege label, object label, and user label arranged along respective axes of the three-dimensional view. The privilege state data can be displayed in one or more cells arranged in association with respective privilege label(s), object label(s), and user label(s). The privilege label identifies at least one privilege, the object label identifies at least one object associated with the privilege, and the user label identifies at least one user or group of users associated with the object. The objects can be data and/or software components accessible by the network system. The privilege labels can identify data access, data view, and data flow privileges to access or transfer data pertaining to the object within or without the network system, and/or use privileges relative to software component objects. The object labels can identify respective data object (s) stored in a database accessible by the network system, or software component object(s) accessible by the network system. The user labels can identify at least one user and/or user group.

A second method of the invention comprises generating a display of privilege state data in an array of cells in a three-dimensional view on a terminal device, the privilege state data of the cells displayed in correspondence with privilege labels, object labels, and user labels arranged along respective transverse axes of the three-dimensional view. The display is generated by the user interface of a terminal device. The privilege labels can be generated based on respective privilege data, the object labels can be generated based on respective object data, and the user data can be generated based on respective user data. The method can include inputting privilege state data with the user interface of the terminal device into at least one cell of the array using at least one privilege label, object label, and user label. The second method can also include determining the privilege data, object data, and user data corresponding to the cell in which the privilege state data is input. The second method can also include storing the privilege state data in a memory in correspondence with respective privilege data, object data, and user data for the cell in which the privilege state data was input. The second method can further include updating the display to include privilege state data input by the user in the inputting step, based on the privilege state data stored in the memory. The privilege state data can include data for "on", "inherited on", "public on", "off", "not set", and "disabled" states. The privilege labels, object labels, or user labels can be implemented as software controls. The second method can also include selecting at least one of the privilege labels, object labels, or user labels with the user interface of the terminal device, and modifying the display of the privilege state data by removing or adding cells in the three-dimensional view based on the selected one of the privilege labels, object labels, or user labels. The user data can identify first and second user entities related by a predetermined hierarchical relationship, and the privilege state data can be input in at least one cell corresponding to first user entity in the inputting step. The second method can further include determining whether the second user entity inherits privilege state data from the first user entity, based on the hierarchical relationship. If the determination establishes that the second user entity inherits the privilege state data from the first user entity, the second method includes storing the privilege state data in correspondence with the user data for the second entity and the object data and privilege data for which the privilege state data was input in the inputting step. The second method can further include determining whether a first object inherits the privilege state data of a second object, based on predetermined dependency data. If so, the second method stores the privilege state data for the first object as the privilege state data for the second object for the user data designated by the inputting step. The second method can further include determining whether a first privilege inherits the privilege state data of a second privilege, based on the predetermined dependency data. If the determination establishes that the first privilege inherits the privilege state data of a second privilege, the second method includes storing the privilege state data in correspondence with the first and second privilege data for the object and user data specified by the inputting step.

A network system of the invention comprises at least one terminal device, a data storage unit, and at least one server. The terminal device has a user interface generating a display of privilege state data in an array of cells in a three-dimensional view. The cells are displayed in correspondence with privilege labels, object labels, and user labels arranged along respective transverse axes of the three-dimensional view. The data storage unit is coupled to the terminal device. The data storage unit stores corresponding privilege data, object data, user data, and privilege state data. The terminal device can be used to generate privilege state symbols, privilege labels, object labels, and user labels, based on the privilege state data, privilege data, object data, user data, respectively. The server is coupled to the terminal device and the data storage unit. The server transmits privilege state data, privilege data, object data, and user data between the terminal device and the data storage unit. The display can be generated on the user interface by an application program running on the terminal device. The application program can include an interface to convert privilege state data, privilege data, object data, and user data into privilege state symbols, privilege labels, object labels, user labels, respectively, for display on the user interface of the terminal device.

An article of manufacture of the comprises a storage medium having an application program for generating a display in a three-dimensional view on a terminal device based on privilege state data.

An object of the invention is to display privilege state data in a readily comprehensible manner.

Another object of the invention is to permit privilege state settings to be readily effected.

A further object of the invention is to permit derivation of privilege states to be displayed so as to be readily understandable.

These together with other objects and advantages, which will become subsequently apparent, reside in the details of construction and operation as more fully hereinafter described and claimed, reference being made to the accompanying drawings, forming a part hereof wherein like numerals refer to like parts throughout the several views.

BRIEF DESCRIPTION OF THE DRAWINGS

FIG. 7 is a data table including privilege state data for a user;

FIG. 8 is a data table including privilege state data for groups of users;

FIG. 10 is a data table including dependency relationships between privileges;

FIG. 11 is a data table for generating a display based on privilege state data;

FIG. 13 is a view of a dialog box for creating, modifying, or deleting user data;

DESCRIPTION OF THE PREFERRED EMBODIMENTS

Figure 1:
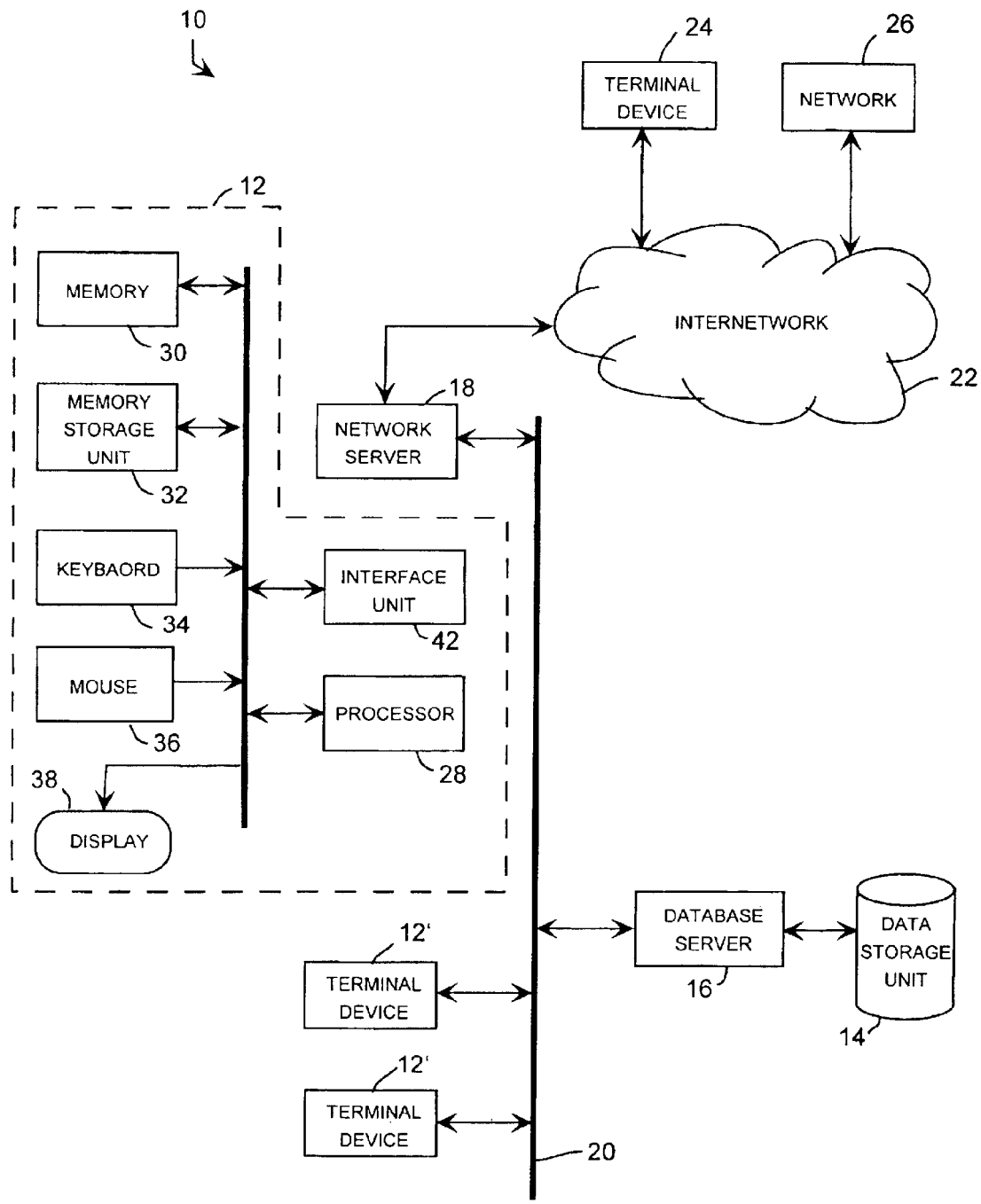
FIG. 1 is a block diagram of a network system in accordance with the invention.

As used herein, the following terms have the following definitions:

"Coupled" in an electronic sense refers to joining electronic components together with a conductive line such as a wire or cable, or by transmission of signals through air or other media, for example, or by transmission of optical signals via optic fiber or other waveguides.

"Database server" is a server for handling transfer of data between a terminal device(s) or network server and a data storage unit.

"Input device" refers to a keyboard, mouse, wand or any other device that can be operated by a user to input commands or data into a client device.

"Interface unit" is an interface between a network server and a terminal device. The interface unit can be an Ethernet® interface card, for example.

"Memory" or "storage media" is used in a general sense refers to any memory storage medium including random-access memory (RAM), read-only memory (ROM), CD-ROM, DVD, hard-storage-disk drives, tape drives, or any other storage device. In the context of a terminal device, memory typically refers to RAM and/or ROM.

"Memory storage unit" refers to a hard-disk drive unit.

"Data storage unit" refers to a hard-disk drive data storage unit or other data storage device.

"Network" can refer to any communications network. Such network can include a local area network (LAN), a wide area network (WAN), and internetwork such as the worldwide web, depending upon context.

"Network server" is a server for handling transmission of data and signals for objects supported by the network system and data between one or more terminal device(s) and an internetwork such as the world wide web or Internet.

"Object" as used herein is the subject of a privilege, and can include data or software components.

"Privilege" refers to the operations allowed for a user relative to a network resource such as a database, accessible on a network system. The operations can include the ability to access a server of the network system, view the contents of a file directory, create, delete, read, write, or transfer data on a network system. "Privilege" also refers to operations allowed for a user relative to a software component, such as the ability to use the component or portions thereof.

"Privilege state data" is a data representation of the state of a particular privilege. The privilege state data can have states including "on", "inherited on", "public on", "off", "not set", and "disabled" states.

"Terminal device" refers to any processing device that has the capability to generate a display. The terminal device can be a personal computer, a network terminal, a personal digital assistant, or other device.

"User entity" refers to a user or group of users. Groups can be subgroups of other groups.

"(s)" after a word means "one or more" of the thing meant by that word.

"Server" refers to a processing device that is responsive to commands from a terminal device. The server can be a computer. The server can also be capable of handling document data from the terminal device.

"Standard protocol" means a protocol in use by more than one million users.

"(s)" at the end of a word means "one or more." For example, "subsystem(s)" means "one or more subsystems."

1. The Network System

In FIG. 1, an exemplary network environment for the invention is shown. In FIG. 1, a network system 10 generally includes at least one terminal device 12, additional terminal devices 12' (two are shown in FIG. 1), a data storage unit 14, a database server 16, network server 18, and a network 20. The terminal device 12 for which internal details are shown is coupled to the network server 18 and can be used by a system administrator, for example, to manage the network system 10. The terminal device 12 runs an application program of the invention to generate a display of privilege state data in a three-dimensional view. As with the other components of the network system 10, the network server 18 is coupled to the network 20 via standard electrical or optical connections. The terminal devices 12' are coupled to the network 20 and run client application programs that can be used to interact with the network server 18 that runs a server program. The network server 18 manages transfer of control signals and data between the terminal devices 12, 12' and the data storage unit 14 via the database server 16. Within the network system 10, the data and signals can be transferred in a predetermined network protocol such as the Ethernet® protocol. The database server 16 is coupled to the network 20 and the data storage unit 14 and manages transfer of data and control signals between the network 20 and the data storage unit 14. The data storage unit 14 stores data tables that include user data, object data, privilege data, and privilege state data. The data storage unit 14 can also store parent group data, object dependency relationships, and privilege dependency relationships. In running its application program, the terminal device 12 uses the data stored in the data storage unit 14 as will be described in more detail in a subsequent section of this document.

The network server 18 can be coupled to internetwork 22 such as the world wide web via a standard telephone line, T1 line, broadband, digital subscriber line (DSL) using TCP/IP (HTTP), FTP, or other standard protocols for the signals transmitted thereon. The internetwork 22 can be coupled to remote terminal device(s) 24 and/or remote network(s) 26 that can have objects, i.e., data or software components, used by the users of the network system 10.

The terminal device(s) 12 can include a processor 28, a memory 30, a memory storage unit 32, a keyboard 34, and a mouse 36. The terminal device(s) 12 includes a display 38. The terminal device(s) 12 can also include an interface unit 42 coupled to the network server 18. The processor 28, the memory 30, the memory storage unit 32, keyboard 34, mouse 36, display 38, and interface unit 42 are coupled to a bus 40 of the terminal device(s) 12. The processor 28 can be a microprocessor such as a Pentium® I, II or III, Pentium Pro®, Celeron®, or Merced® microprocessor produced by Intel® Corporation, Palo Alto, Calif., an Athlon® or K7-generation microprocessor produced by Advanced Micro Devices®, Inc., Palo Alto, Calif., or an equivalent or more advanced generation of microprocessor. Alternatively, the processor 28 can be implemented as a microcontroller, programmable logic array (PLA), field programmable logic array (FPLA), programmed array logic (PAL), or other processing device. The processor 28 is coupled to a memory 30 that can include a random-access memory (RAM) and a read-only memory (ROM). The RAM provides relatively high-speed data and application program access to the processor 28. The ROM stores data in a non-volatile fashion such as the basic input/output system (BIOS) executed by the processor 28 upon power-up of the terminal device 12. The memory 30 stores the client program, application program and its interface modules, and operating system used by the processor 28 in operation thereof. The memory 30 also stores predetermined data therein or that is generated by the processor 28 as it executes the application program. The memory 13 can also store data retrieved from the data storage unit 14. The memory 13 is of course of sufficient size to hold such data, and can be on the order of one megabyte or more, for example. The processor 28 can use data stored in the memory 30 to generate a display on the unit 38. The display unit 38 can be a cathode ray tube (CRT), flat-panel liquid-crystal display (LCD), or other type of display unit. The processor 28 is also coupled to a memory storage unit 32 such as a hard disk-drive unit. The memory storage unit 32 stores application programs and data files if not in use by the processor 28. The keyboard and mouse input devices 34, 36 can be operated by a user to generate and data or control signals to the processor 28. The processor 28 is coupled to supply a display signal to the display unit 38 to generate a display, based on the user data, object data, privilege data, and privilege state data stored in the data storage unit 14. The display signal is generated by the processor 28 and stored in the memory 30. The processor 28 can periodically retrieve the display data from the memory 30 and generate the display signal based thereon. The database and network servers 16, 18 can be implemented by many commercially-available devices including many available from Dell® Corporation, Round Rock, Tex., International Business Machines® Corporation, Armonk, N.Y., Compaq® Corporation, Houston, Tex., Hewlett-Packard® Corporation, Palo Alto, Calif., and others.

In the network system 10, users are uniquely identified by user data. The users of the network system 10 generally have differing privilege rights with respect to use of data or software components residing on servers 16, 18, data storage unit 14, or terminal devices 12, 12'. Such data or software components are referred to as "objects" herein, and these objects are uniquely identified by "object data". The different uses that user can perform with the objects are referred to as "privileges" that are uniquely identified in the network system 10 by "privilege data". "Privilege state data" refers to the state of a privilege. Such privilege state data generally includes at least "on" and "off" states corresponding to permission and prohibition, respectively, of the exercise of a privilege of an object for a user. The privilege state data can also include "inherited on", "public on", "not set", and "disabled" states whose meaning will be explained in a subsequent section of this document.

The terminal device 12 has a user interface generating a display of privilege state data in an array of cells in a three-dimensional view. The user interface is defined as the portion of the terminal device that permits a user to interact with the terminal device 12, and generally includes the keyboard 34, the mouse 36, the display 38 the portion of the application program stored in the memory 30 and executed by the processor 28 to generate a display on the unit 38. The user interface also receives and processes data and control signals input by the user via the keyboard 34, the mouse 36, and the display 38. The user interface of the terminal device 12 can be used to create, modify or delete user data, object data, privilege state data, hierarchical relationships between different user entities, and dependency relationships between different objects or different privileges.

Running under the application program of the invention, the terminal device 12 reads user data, object data, privilege data, and privilege state data. In the typical case, the terminal device 12 retrieves such data from the data storage unit 14 via the database server 16, the network 20, and the network server 18. Based on the user data, object data, privilege data, and privilege state data, the terminal device 12 generates a display of privilege state data for the network system 10 in a three-dimensional view cells are displayed in correspondence with privilege labels, object labels, and user labels. The privilege labels, object labels, and user labels visually identify the various users, objects, and privileges of the network system 10. The privilege labels, object labels, and user labels are generated by the terminal device 12 from the user data, object data, and privilege data, respectively. The privilege labels, object labels, and user labels are arranged along respective transverse axes of the three-dimensional view. The privilege state data is displayed in correspondence with respective privilege labels, object labels, and user labels. The privilege state data can be represented as graphical symbols representing "on", "off", "inherited on", "public on", "not set", and "disabled" states.

2. General Method of the Invention

Figure 2:
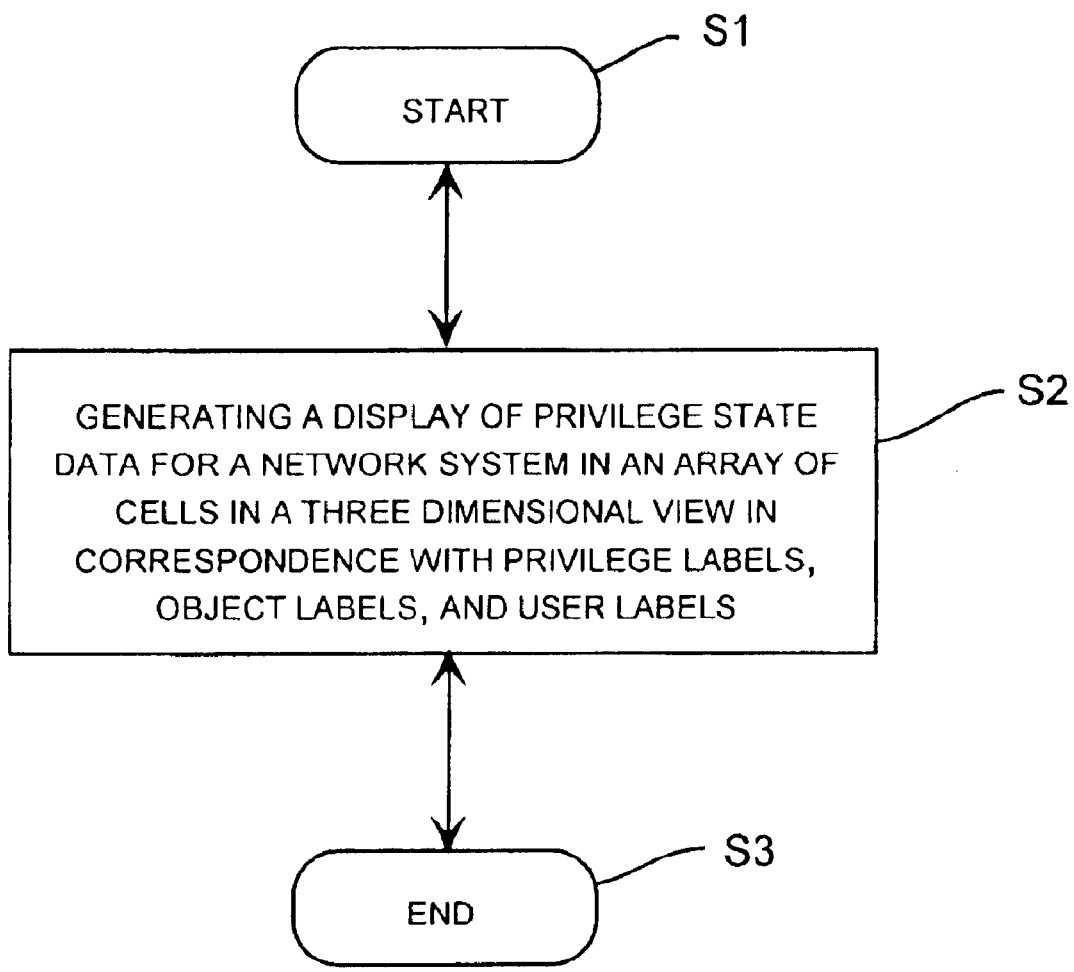
FIG. 2 is a general flow chart of the method of the invention.

FIG. 2 is a flowchart of a general method of the invention. The method of FIG. 2 can be executed by the application program of the invention running on the terminal device 12. The method starts in step S1. In step S2, a display of privilege state data for a network system 10 is generated. The privilege state data is displayed in correspondence with privilege labels, object labels, and user labels in a three-dimensional view. The three-dimensional view permits facilitates viewing of the privilege state data, as will become more apparent in reference to FIGS. 3 and 4.

3. Display of Privilege State Data

Figure 3:
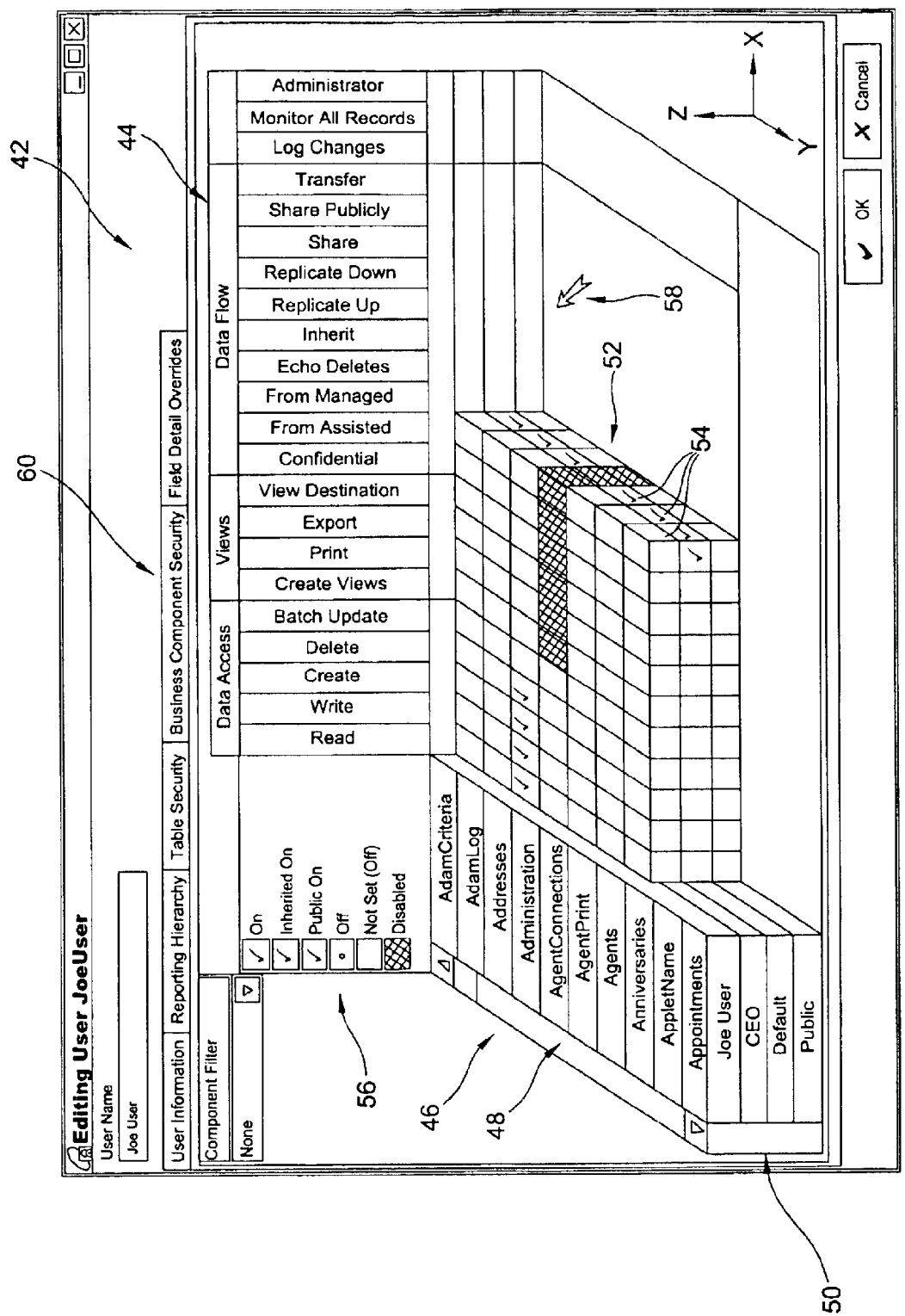
FIG. 3 is an exemplary view of privilege state data generated for data tables in accordance with the invention.

FIG. 3 is an exemplary view of a display 42 of a three-dimensional view of privilege state data in accordance with the invention. The display 42 can be generated on the display unit 38 of the terminal device 12. The display 42 of FIG. 3 pertains to objects that are data that can be used by users or groups of users in the network system 10. The display 42 includes privilege labels 44 arranged along an x-axis of the three-dimensional view in FIG. 3. The privilege labels correspond to the privilege data. The privilege labels identify "Data Access", "Views", and "Data Flow" categories of privileges. The privilege labels for data access privileges include "Read", "Write", "Create", "Delete", and "Batch Update" corresponding to privileges for reading, writing, creating, deleting, or updating data, respectively, stored in the network system 10. The privilege labels for "Views" include "Create Views", "Print", "Export", "View Destination" corresponding to privileges for creating a view of data, printing data, exporting data, and at which data is to be viewed. The privilege labels for "Data Flow" include "Confidential", "From Assisted", "From Managed", "Echo Deletes", "Inherit", "Replicate Up", "Replicate Down", "Share", "Share Publicly" and "Transfer". The "Confidential" label corresponds to the privilege to transfer confidential data, the "From Assisted" label corresponds to the privilege to transfer data from a lower level user entity to a higher level user group based on predetermined hierarchy relationships among user entities. The "From Managed" label corresponds to the privilege to transfer data from a higher level user group to a lower level user entity based on predetermined hierarchy relationships among user entities. The "Echo Deletes" label refers to the privilege to affect a delete across more than one level of user entities in the hierarchical relationship established for users of the network system 10. The "Inherit" label refers to the privilege to inherit privilege rights from other user entities based on the hierarchical relationship predetermined for the users of the network system 10. The "Replicate Up" and "Replicate Down" labels refer to the privileges to replicate data up or down hierarchical levels, respectively. The "Share" label refers to the privilege to share data within a predetermined group of users. The "Share Publicly" label refers to the privilege of a user to permit data to be accessed by users remote from the network system 10. The "Transfer" label refers to the privilege to transfer data to any other user within or without the network system 10.

Arranged along the y-axis direction of the three-dimensional view of the display 42 are object labels 46 identifying respective objects that in this case are data tables. The data objects generally vary between different network systems. Accordingly, the particular data objects such as "AdamCriteria", "AdamLog", "Addresses", "Administration", etc. are exemplary only, and can be defined differently for implementation in other network systems. There can be numerous object data, and a scroll bar 48 can be used to select predetermined object data for display. The scroll bar 48 can be used to scroll through an alphabetical listing, for example, of the data objects used by the users of the network system 10.

Along the z-axis direction are arranged user labels corresponding to respective users of the network system 10. The user labels in FIG. 3 include "Public", "Default", "CEO" and "JoeUser" in FIG. 2. The "Public" label corresponds to a public group and is used to set privileges for objects that are available to all users of the network system 10. The "Default" label corresponds to a default user group and is used to set privileges if no privilege state data is set for corresponding objects and privileges for a user group(s) or user(s). The "CEO" label is a representative label for a group of users of the network system 10. The "JoeUser" label applies to a user of the network system 10.

Arranged in correspondence with the privilege labels 44, the object labels 46, and the user labels 50 are cells 52. The cells 52 are basically graphical cubes, only a few of which are specifically designated in FIG. 3. The cells 52 are arranged in correspondence with respective privilege labels 44, object labels 46, and user labels 50. The cells 52 include respective privilege state data corresponding to the privilege data, object data, and user data for the labels 44, 46, 50, respectively. As indicated by key 54 of the display 42, the privilege state data includes "On", "Off", "Inherited on", "Public on", "Not Set (Off)", and "Disabled" states and is represented by respective graphical symbols, i.e., a green check, yellow check, blue check, red bullet, blank field, and cross-hatch, respectively. The "On" state indicates that the privilege has been set to permit its exercise by the corresponding object and user entity. "Inherited On" indicates that the privilege has been permitted for a corresponding object and user entity by inheritance from an "On" state setting at a higher level within the predetermined hierarchical relationship of user entities. For example, if privilege state data is activated in a group to which a user belongs, the user will inherit the associated privilege due to the predetermined hierarchical relationship. The "Public On" state indicates that the privilege has been permitted for the corresponding object and user entity by at the public level of the hierarchical relationship. The "Off" state indicates that the privilege is affirmatively not permitted for the corresponding object and user entity. The "Not Set (Off)" indicates that the privilege is prohibited for the corresponding object and user entity, but could be permitted if a setting at a different hierarchical level, object dependencies, or user dependencies so allow. The "Disabled" state indicates a state that is not possible for the corresponding privilege, object, and user.

The user interface of the terminal device 12 can be operated by a user to input privilege state data. For example, the user interface can be controlled via the mouse 36 to position the cursor 58 to point to a predetermined cell 52. By clicking the mouse 36 the user can select a cell 52 and input privilege state data into the selected cell. For all users except the public group level, the user interface can be implemented so that successive clicks of the mouse 36 cause the privilege state data to sequence from "On", "Off", "Not Set (Off)" and "Disabled" states. At the public group level, the user interface can be implemented so that successive clicks of the mouse 36 cause the privilege state data to sequence from "Public On", "Off", "Not Set (Off)" and "Disabled" states. Upon saving the privilege state data set via the user interface of the terminal device 12, the privilege state data for corresponding privilege data, object data, and user data are stored in a data table of the data storage unit 14. The storing of such data can be performed by the network server 18 via the network 20 and database server 16.

The privilege labels 44, the object labels 46, and the user labels 50 are effectively software buttons that can be activated by the user interface to generate remove or add cells from the array displayed in running of the application program on the terminal device 12. This feature permits viewing of privilege state data for any privilege, object and user entity of the network system 10. More specifically, the display of FIG. 3 is that which results from positioning the cursor 58 with the mouse 36 to point to the "From Assisted" privilege label and clicking with the mouse, positioning the cursor with the mouse to point to the "Anniversaries" object label and clicking with the mouse, and positioning the cursor with the mouse to point to the "CEO" label and clicking with the mouse. In general, if a privilege label 44 to the left of the rightmost cells displayed in FIG. 3 is selected with the user interface, the application program will remove all cells to the right of the y-z plane defined by such selected object label. Conversely, if a privilege label 44 to the right of the leftmost displayed cells 52 is selected with the user interface in FIG. 3, the application program will add cells to the right of such selected object label up to the y-z plane defined by the selected object label. If an object label 44 more inward into the plane of the view of FIG. 3 is selected via the user interface, cells that are further outward from the selected object label are removed along a plane parallel to the x-z plane. Conversely, if a privilege label 44 more outwardly from the displayed cells 52 in FIG. 3 is selected with the user interface, the application program running on terminal device 12 will add cells 52 the outwardly to the x-z plane defined by the selected object label. If a user object label that is lower along the z-axis direction relative to the displayed cells 52 is selected via the user interface, the application program running on the terminal device 12 will remove cells above a plane parallel to the x-y plane that corresponds to the selected user label. Conversely, if a user object level that is higher along the z-axis direction in FIG. 3 relative to the displayed cells, the application program will add cells corresponding up to a plane parallel to the x-y plane. Accordingly, the cells 52 of the display 42 can be added or removed to reveal cells 52 and corresponding privilege state data at different levels within the array of cells.

In the foregoing it should be appreciated that the display 42 appears to the user to be three-dimensional, but is in actuality the two-dimensional display generated on the unit 38. The application program therefore has the capability to calculate a projection from the two-dimensional screen to the three-dimensional representation of the display from the user's perspective to determine the position of the cursor 58 upon clicking of the mouse 36 with respect to the user labels, object labels, privilege labels, and cells containing privilege state data. Such coding can be implemented with mathematical projection formulae to project the two-dimensional point to the corresponding cell or label to the three-dimensional view of the user labels, object labels, privilege labels, and cells containing privilege state data.

Figure 4:
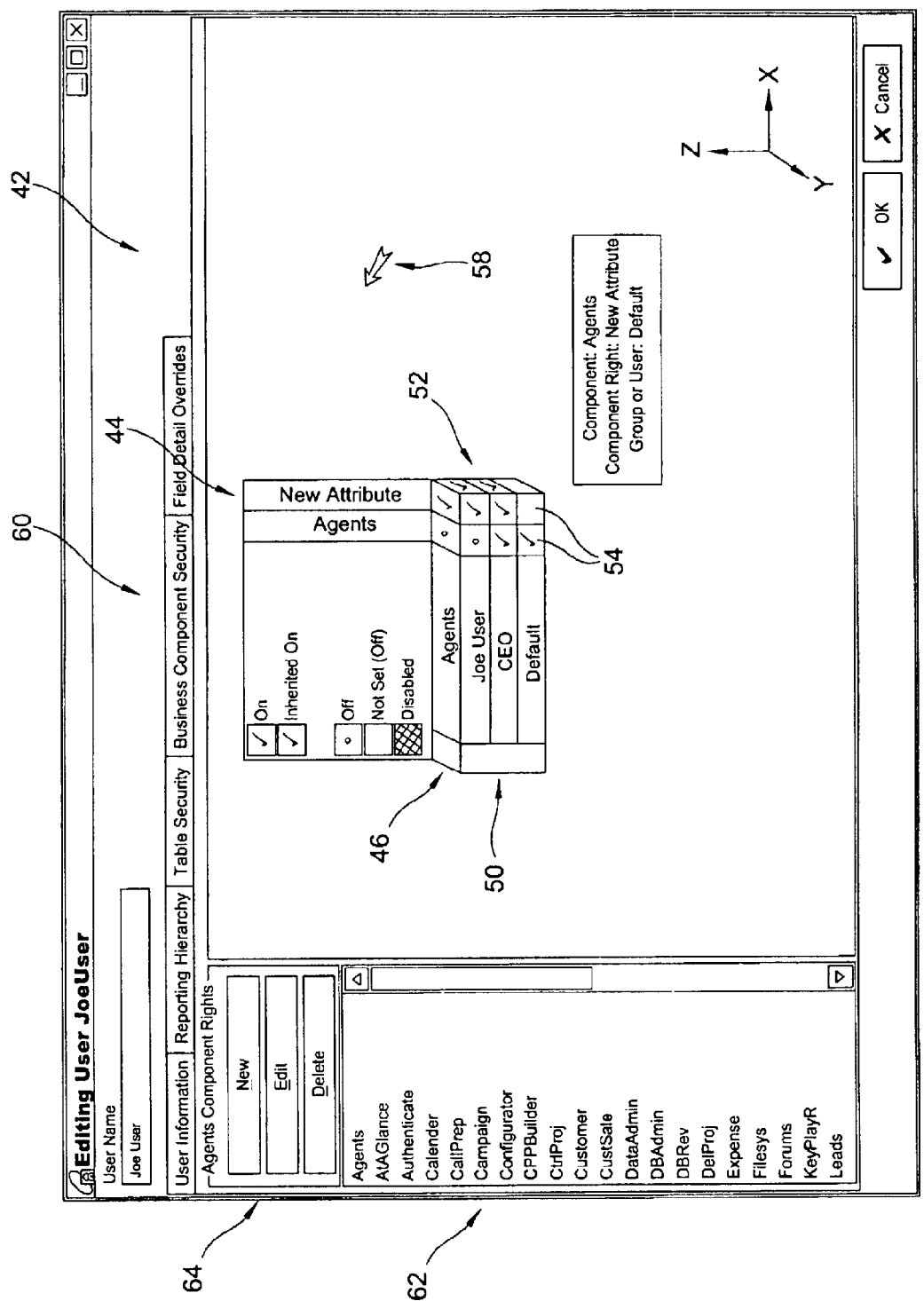
FIG. 4 is an exemplary view of privilege state data generated for a software component supported by a network system.

The user interface of the terminal device 12 can be used to position the cursor 58 to activate one of the tabs 60. The "Table Security" tab is selected via the user interface to generate the view of FIG. 3. If the "Business Component Security" tab is selected via the user interface, the display 42 of FIG. 4 is generated on the display unit 38 of the terminal device 12. The display 42 of FIG. 4 pertains to objects that are software components of the network system 10. As compared to data for which the total number of different privileges is relatively defined, the privileges and objects for software components generally vary widely depending upon the nature of the software components that can be used in the network system 10. Such privileges can include the ability to use a software component or portions thereof. Different software component objects can be selected for display via the user interface by selecting from menu 62 with the cursor 58 and mouse 36. In addition, software buttons 64 can be selected via the cursor 58 and the mouse 36 to create a display 42 for a new software component object, to edit the privilege data, object data, user data, and/or privilege state data for an existing object, or to delete an object.

4. Method for Preparatory Mode of the Invention

Figure 5:
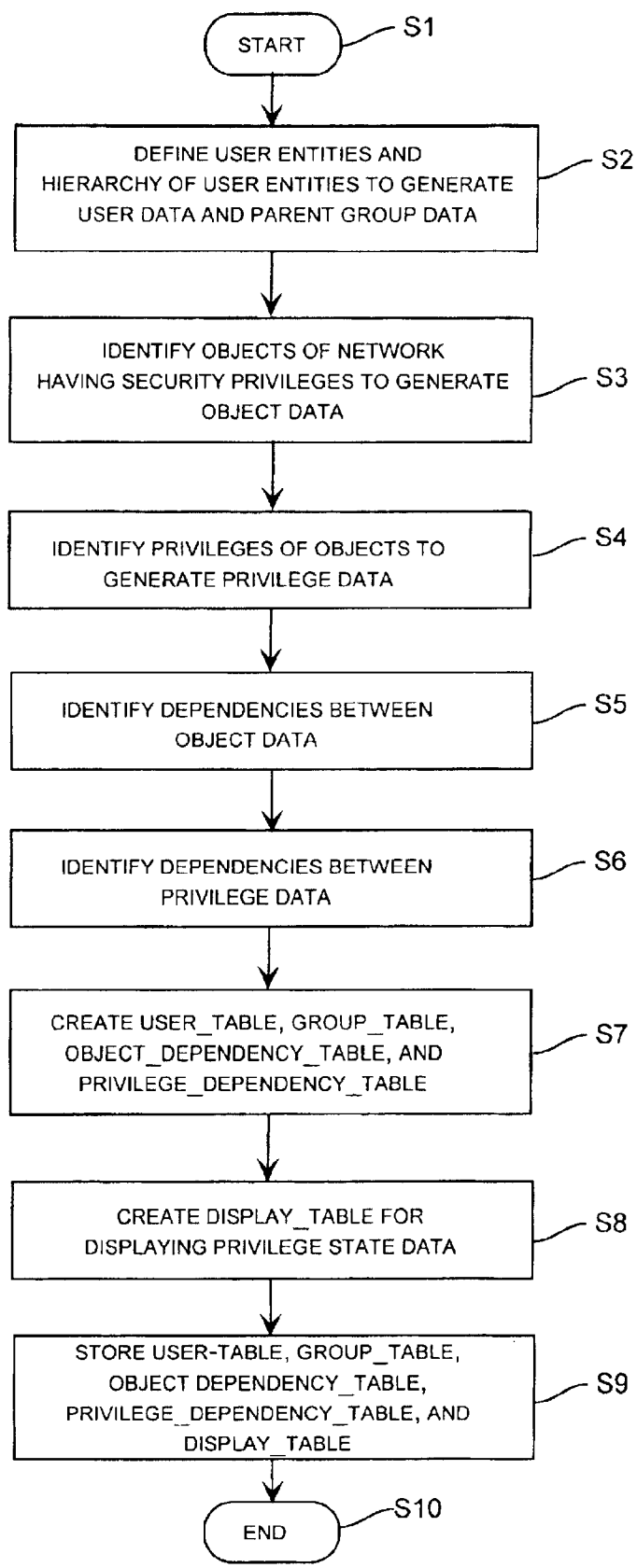
FIG. 5 is a flow chart of a method for creating privilege state data in a preparatory mode of the invention.

In FIG. 5, a method for the preparatory mode of the invention begins in step S1. In step S2 the user entities of the network system 10 and the hierarchical relationships between the user entities are defined to generate user data and parent group data. In step S3, the objects of the network system having security privileges are identified to generate object data. In step S4, the privileges of the objects are identified to generate privilege data. In step S5, the dependencies between objects are identified to create dependencies between objects. In step S6, dependencies between privilege data are identified. In step S7, data tables are created based on the data generated and relationships identified in steps S2–S6. The data tables include USER_TABLE, GROUP_TABLE, OBJECT_DEPENDENCY_TABLE, and PRIVILEGE_DEPENDENCY_TABLE. In step S8, a data table for DISPLAY_TABLE is created for use in generating the display 42. The DISPLAY_TABLE is created based on the USER_TABLE, GROUP_TABLE, OBJECT_DEPENDENCY_TABLE, and the PRIVILEGE_STATE_TABLE. In step S9 of FIG. 5, the USER_TABLE, GROUP_TABLE, OBJECT_DEPENDENCY_TABLE, PRIVILEGE_DEPENDENCY_TABLE, and DISPLAY_TABLE are stored. In step S10 the method of FIG. 5 ends. Steps S1–S6 can be performed by a human user of the method, such as an administrator of the network system 10. Steps S7–S8 are performed by the application program running on the terminal device 12. Step S9 is performed by the terminal device 12 running its application program to store the data tables in the data storage unit 14 via the database server 16, the network 20, and the network server 18.

Figure 6A:
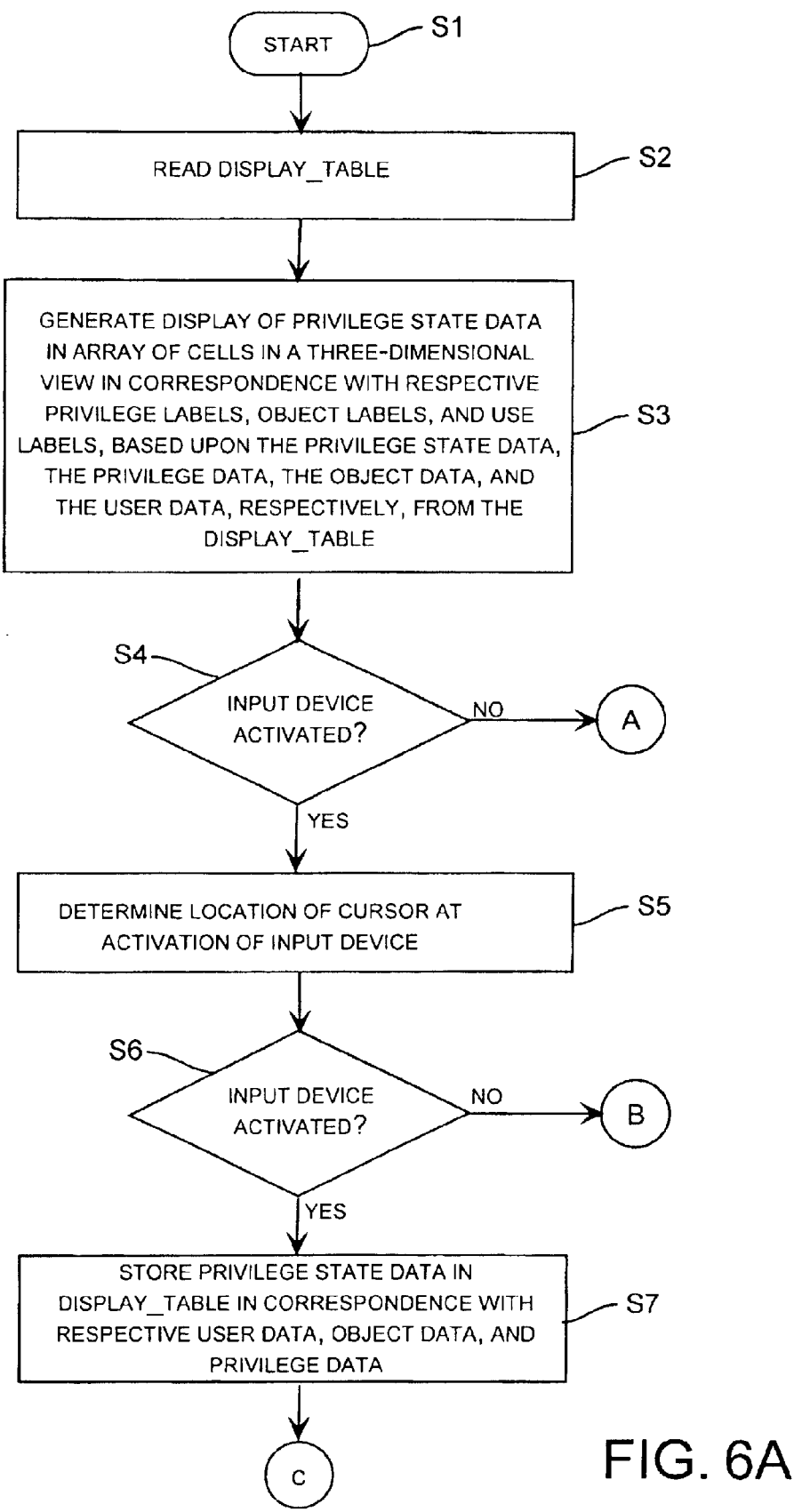
FIGS. 6A and 6B are flowcharts of a method for generating a display based on the privilege state data in an operation mode of the invention.

In step S1 of FIG. 6A, a method for the operation mode of the invention begins in step S1. In step S2 the DISPLAY_TABLE is read. Step S2 can be performed by the terminal device 12 running the application program to read the DISPLAY_TABLE from the data storage unit 14 via the database server 16, the network 20, and the network server 18. In step S3, the display 42 of privilege state data is generated. The display 42 can be generated with privilege state data in an array of cells in a three-dimensional view in correspondence with respective privilege labels, object labels, and user labels, based on the privilege state data, the privilege data, the object data and the user data, respectively, from the DISPLAY_TABLE. In step S4, a determination is made to establish whether an input device such as the mouse 36 has been activated. If so, in step S5, a determination is made to establish the location of the cursor 58 upon activation of the mouse 36. In step S6, a determination is made to establish whether the cursor 58 was pointing to a cell at the time of its activation. If the determination in step S6 is affirmative, in step S7, the privilege state data so input is stored in the DISPLAY_TABLE in correspondence with respective user data, object data, and privilege data. After performance of step S7 or if the determination of step S6 is negative, the method proceeds to step S8 of FIG. 6B. In step S8, a determination is made to establish whether a privilege label, object label, or user label has been selected by the user via the user interface, i.e., via the mouse 36 and the display unit 38. If so, in step S9, the display 42 is modified by adding or removing cells 52 and corresponding privilege state data if the selected privilege label, object label, and user label are different than those for which the display 42 has been generated at the time of activation of the user interface. After performance of steps S4 or S9, or if the determination in step S8 is negative, the method of FIGS. 6A and 6B ends in step S16. Steps S1–S10 of the method of FIGS. 6A and 6B can be performed by the terminal device 12 running the application program. Steps S2 and S7 can be performed by the data storage unit 14, the database server 16, the network 20, and the network server 18 in addition to the terminal device 12 under control of the application program.

5. Data Tables

FIG. 7 is a view of the USER_TABLE data table. The USER_TABLE basically includes five columns of associated data. The USER_ID column uniquely identifies the users of the network system 10, in this example "JoeUser" by user data. The PARENT_GROUP_ID column uniquely identifies a group of users to which the corresponding user belongs, and establishes the hierarchical relationships among the users and groups. In this example, the user "JoeUser" is a member of the group "CEO". The objects pertaining to the user include data tables "AdamCriteria", "AdamLog", "Addresses", "Administration", etc. The privilege states "Read", "Write", etc. are stored in the USER_TABLE in correspondence with the object data to which they pertain. The privilege state data for the "Off", "On", and "No Value" states are associated with respective privilege data. The bullets indicate that there can be additional data for additional users, parent groups, objects, privileges, and privilege states.

FIG. 8 is a view of the GROUP_TABLE and has five columns of associated data. The GROUP_ID column uniquely identifies the groups of user entities in the network system 10. In this example the groups include "Public", "Default", and "CEO" groups. In the second column PARENT_GROUP_ID is indicated. In this case, "None" indicates that there is no parent group associated with the groups listed in the GROUP_TABLE. In the object column, the object data are stored in correspondence with respective user data identifying the groups. In this example, the object data includes "AdamCriteria", "AdamLog", "Addresses", "Administration", etc. In correspondence with the object data are stored privilege data. In this example, the privilege data include "Read", "Write", etc. Also, the privilege state data is stored in correspondence with respective privilege data, object data, and user data. The privilege state data can include "On", "Off", and "No Value" states, although none of the privilege state data is set to "Off" in the example of FIG. 8.

Figure 9:
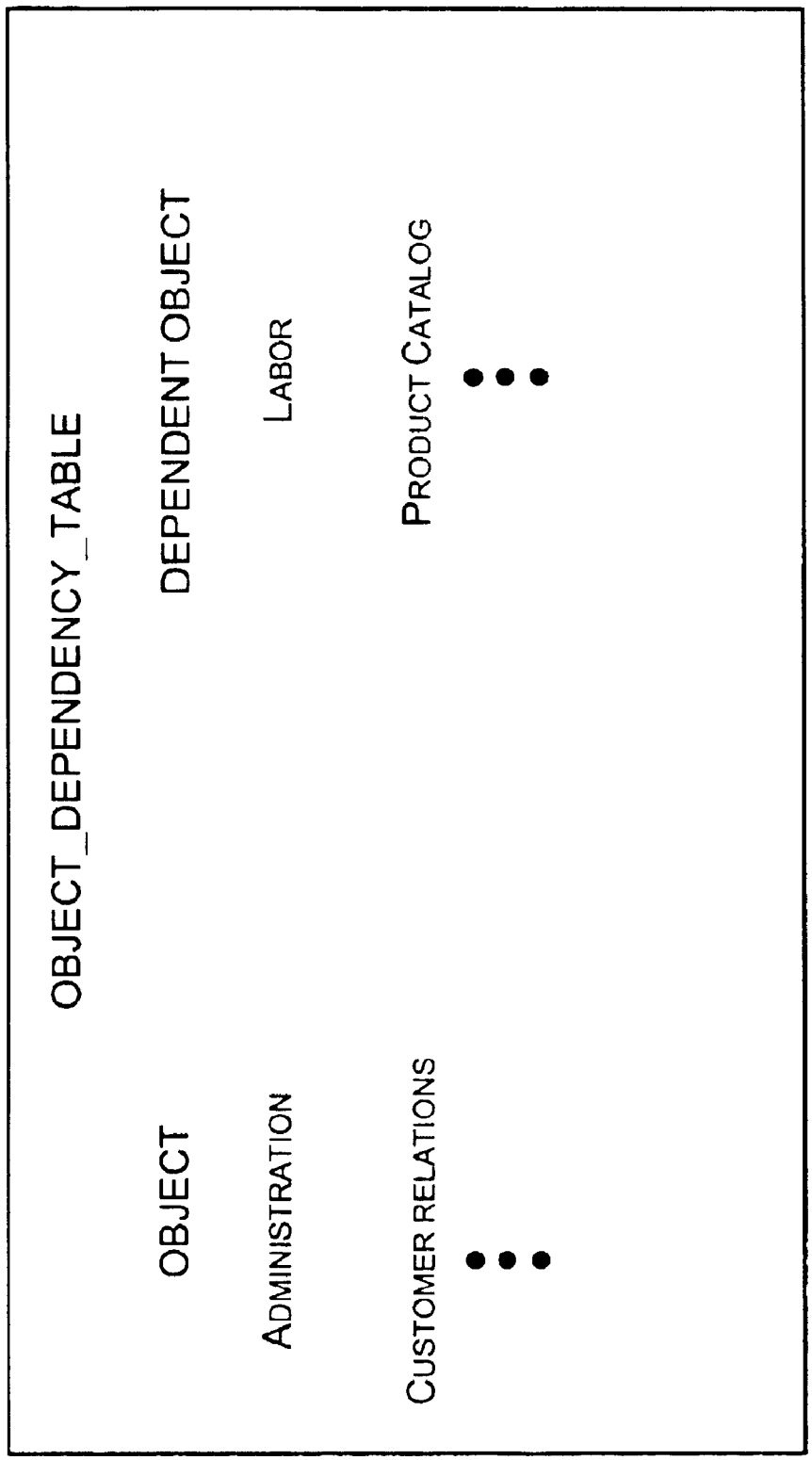
FIG. 9 is a data table including indicating dependency relationships between objects.

FIG. 9 is a view of the OBJECT_DEPENDENCY_TABLE that has two columns of associated object data. The OBJECT column has object data that identifies respective objects, and the DEPENDENT OBJECT column indicates object data of objects whose privilege states are dependent from the objects identified by object data in the OBJECT column. The OBJECT_DEPENDENCY_TABLE can be used to set dependencies of the privilege state data for different objects. The application program running on the terminal device 12 uses the OBJECT_DEPENDENCY_TABLE to replicate the privilege state data associated with the object identified by the object data of the OBJECT column to the privilege state data associated with the object identified by the object data of the DEPENDENT OBJECT column. Therefore, in the example of FIG. 9, the privilege state data of the "Administration" object will be replicated or copied to the "Labor" object for all user data.

FIG. 10 is a view of the PRIVILEGE_DEPENDENCY_TABLE that has two columns of associated privilege data. The PRIVILEGE column has privilege data that identifies respective privileges, and the DEPENDENT PRIVILEGE column indicates privilege data of privileges whose privilege states are dependent from the privileges identified by privilege data in the PRIVILEGE column. The PRIVILEGE_DEPENDENCY_TABLE can be used to set dependencies of the privilege state data for different privileges. The application program running on the terminal device 12 uses the PRIVILEGE_DEPENDENCY_TABLE to replicate the privilege state data associated with the privilege identified by the privilege data of the PRIVILEGE column to the privilege state data associated with the privilege identified by the privilege data of the DEPENDENT PRIVILEGE column. Therefore, in the example of FIG. 8, the privilege state data of the "Read" privilege will be replicated or copied by the application program running on the terminal 12 to the "Write, Create, Delete" privilege for all user data. Therefore, if the privilege state data is set to allow a user to read data of an object, the user will also have the capability to write, create, or delete that object.

FIG. 11 is a view of a DISPLAY_TABLE that has four columns of associated data. The USER/GROUP_ID column stores the user data for all groups and users of the network system 10. The OBJECT column stores object data for all data and software component objects of the network system 10 used by the user entities. The PRIVILEGE column stores privilege data of the privileges associated with the objects of the OBJECT column. The STATE columns stores privilege state data corresponding to the privileges of the network system 10. The DISPLAY_TABLE is generated by the terminal 12 running the application program based on the USER_TABLE, GROUP_TABLE, OBJECT_DEPENDENCY_TABLE, and PRIVILEGE_DEPENDENCY_TABLE. The generation of the DISPLAY_TABLE corresponds to step S8 of FIG. 5. The DISPLAY_TABLE is generated as follows. The user data, object data, privilege data, and privilege state data are replicated from the Public GROUP_ID of the GROUP_TABLE to the DISPLAY_TABLE. The "On" states for the privilege state data of the Public GROUP_ID are converted to "Public On" states in the DISPLAY_TABLE for corresponding user data, object data, and privilege data. The user data, object data, privilege data, and privilege state data for the Default, CEO, and JoeUser GROUP_IDs are replicated to the DISPLAY_TABLE so that "On", "Off" and "No Value" states of the USER_TABLE and GROUP_TABLE translate to"On", "Off", and "Not Set (Off)" states in the DISPLAY_TABLE. The OBJECT_DEPENDENCY_TABLE is used to replicate privilege state data for objects listed therein to privilege state data for dependent objects. The PRIVILEGE_DEPENDENCY_TABLE is used to replicate privilege state data for privileges listed in the table to the privilege state data for dependent privileges. The "Public On" and "Off" states for the public GROUP_ID in the DISPLAY table are replicated to the privilege state data for the user entities. The privilege state data of the Default group are replicated to the corresponding privilege state data for the user entities. In the event of a conflict between the privilege state data designated by the Public GROUP_ID and the privilege state data designated by the Default, user or user group privilege state data, the Public GROUP_ID overrides the Default, user or user group privilege state data. Accordingly, under the AdamLog object for the CEO GROUP_ID the privilege state data is set to the "Public On" state despite the fact that the Default privilege state data is in the "On" state. The PARENT_GROUP_ID of the USER_TABLE is utilized by the application program to determine the user hierarchy. In this example, because JoeUser is in the CEO group as indicated the PARENT_GROUP_ID, the "On" state for the CEO GROUP_ID privilege state data for the Addresses object is inherited by corresponding privilege state data for JoeUser, and such state is designated as "Inherited On" with respect the Addresses object for JoeUser. The application program running on the terminal device 12 thus generates the DISPLAY_TABLE.

Figure 12:
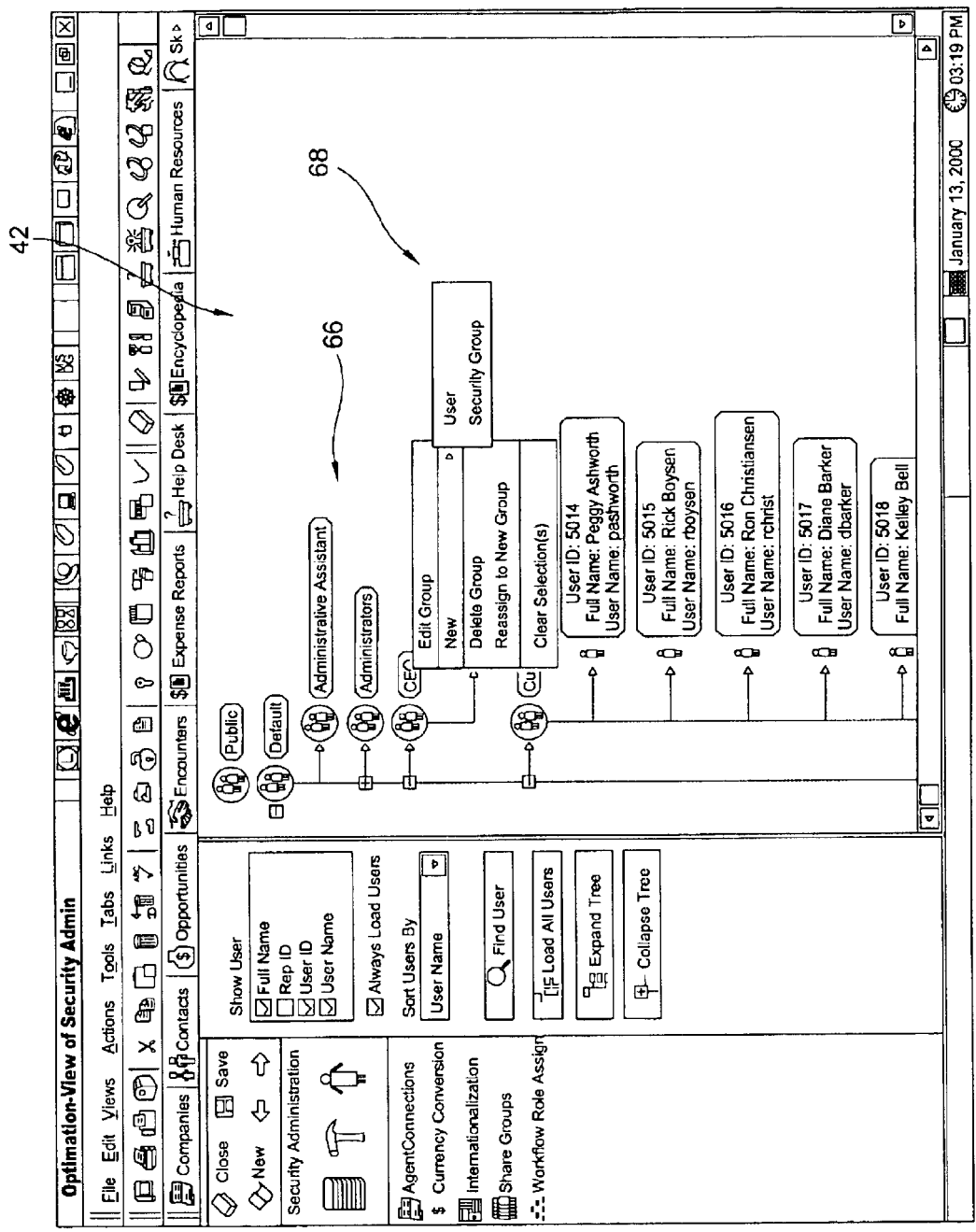
FIG. 12 is a display generated by a user interface of a terminal device in the network system to permit a user to create or modify users, user groups, and hierarchical relationships between the user entities.

FIG. 12 is a view of a display 42 that can be generated by the terminal device 12 in running its application program. The display 42 includes a hierarchy tree 66 generated by the user data and corresponding parent group data stored as USER_ID, GROUP_ID, and PARENT_GROUP_ID in the USER_TABLE and GROUP_TABLE. FIG. 12 indicates an exemplary pop-up menu 68 for adding, deleting, or modifying user data via the terminal device 12. An administrator can use the input devices 34, 36 of the terminal 12 to create, read, modify or delete user data via the display 42 of FIG. 13. Based on the user data input to the terminal device 12, the terminal device 12 writes changes to the data tables for USER_TABLE, GROUP_TABLE, and DISPLAY_TABLE to the data storage unit 14 via the database server 16, the network 20, and the network server 18.

Figure 13:
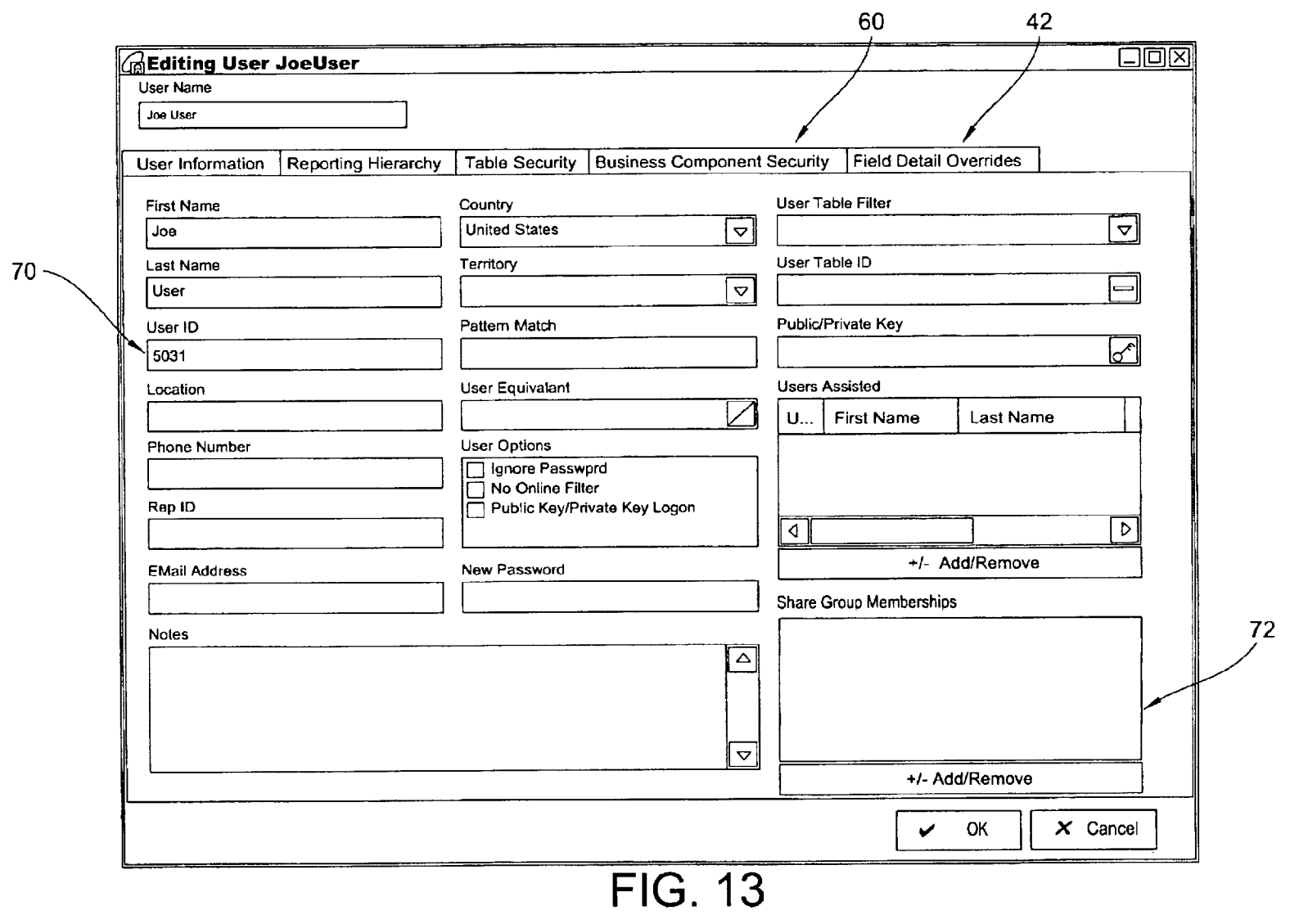

FIG. 13 is a view of a display 42 that is generated by selection of the "New" and "User" options in the pop-up menu 68 of FIG. 12. Interacting with the display 42 via the input devices 34, 36, a network administrator can input user data including a USER_ID in field 70, and other data pertaining to a new user entity. Parent group data can be input to field 72 via the input devices 34, 36 to indicate PARENT_GROUP_ID data for a group of which the user identified by the USER_ID field is a member. A similar display can be used to input, modify or delete user data for a group of users by selection of the "New" and "Security Group" options in the pop-up menu 68. The display 42 of FIG. 13 can be generated by selection of the "User Information" tab 60 with the input devices 34, 36.

Figure 14:
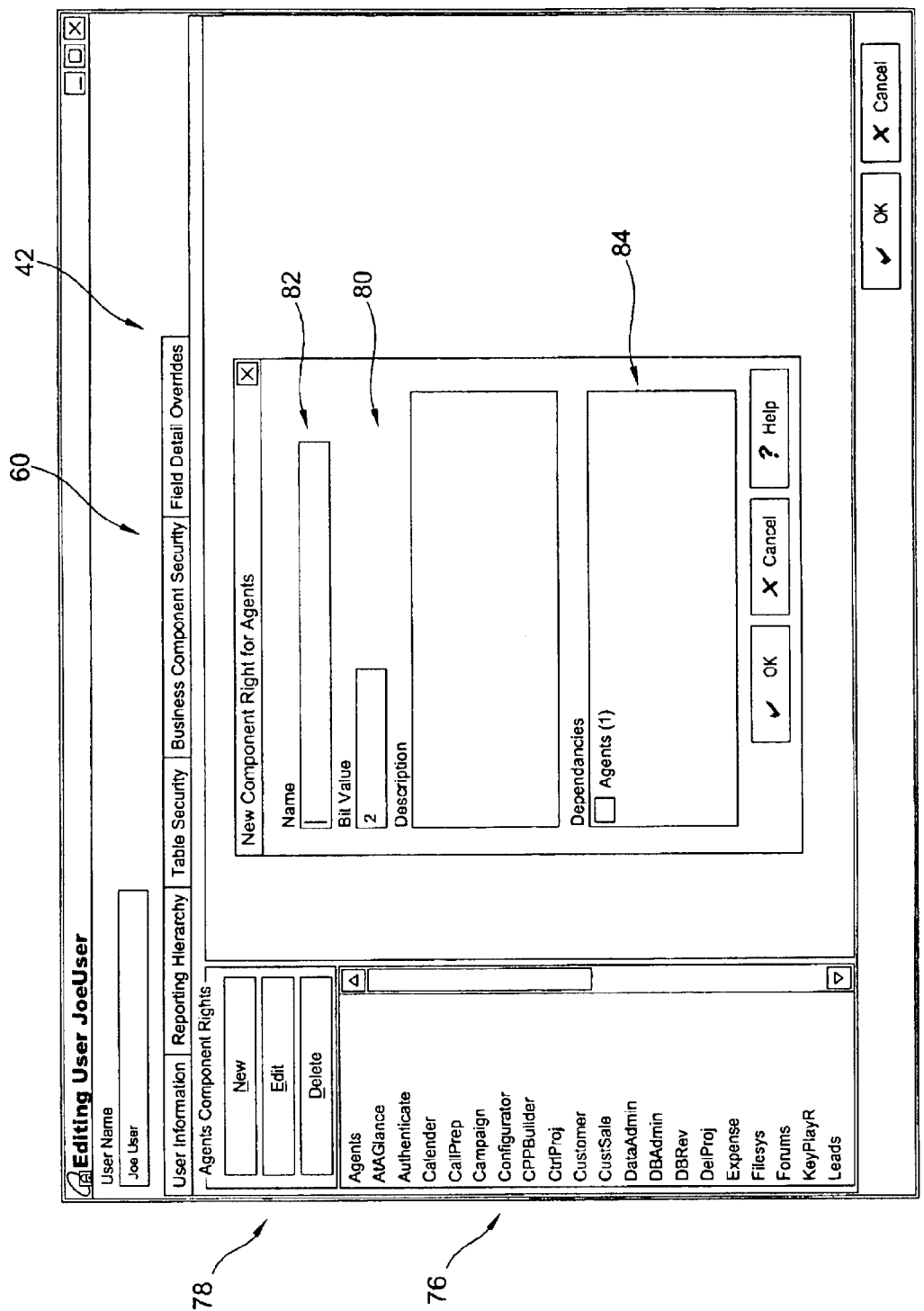
FIG. 14 is a view of a dialog box for creating, modifying, or deleting privilege data.

FIG. 14 is a view of a display 42 that is generated by selection of the "Business Component Security" tab 60 via the input devices 34, 36 and the display 42. Further selection of the "Agents" option in menu 76 and the "New" control element under the "Agents Components Rights" software control elements 78 via the input devices 34, 36 and the display 42, generates dialog box 80. The dialog box 80 includes field 76 for entering privilege data identifying a privilege of an object. The dialog box 80 also includes a "Dependencies" field 84 for entering dependent privilege data for storage in the PRIVILEGE_DEPENDENCY_TABLE. Upon clicking the "OK" control element of the dialog box 80, the terminal device 12 writes the privilege data and dependent privilege data to the USER_TABLE, GROUP_TABLE, and PRIVILEGE_DEPENDENCY_TABLE. The terminal device 12 regenerates the DISPLAY_TABLE based on the USER_TABLE, GROUP_TABLE, OBJECT_DEPENDENCY_TABLE, PRIVILEGE_DEPENDENCY_TABLE, and DISPLAY_TABLE to update the DISPLAY_TABLE for the changes made to the privilege data.

Figure 15:
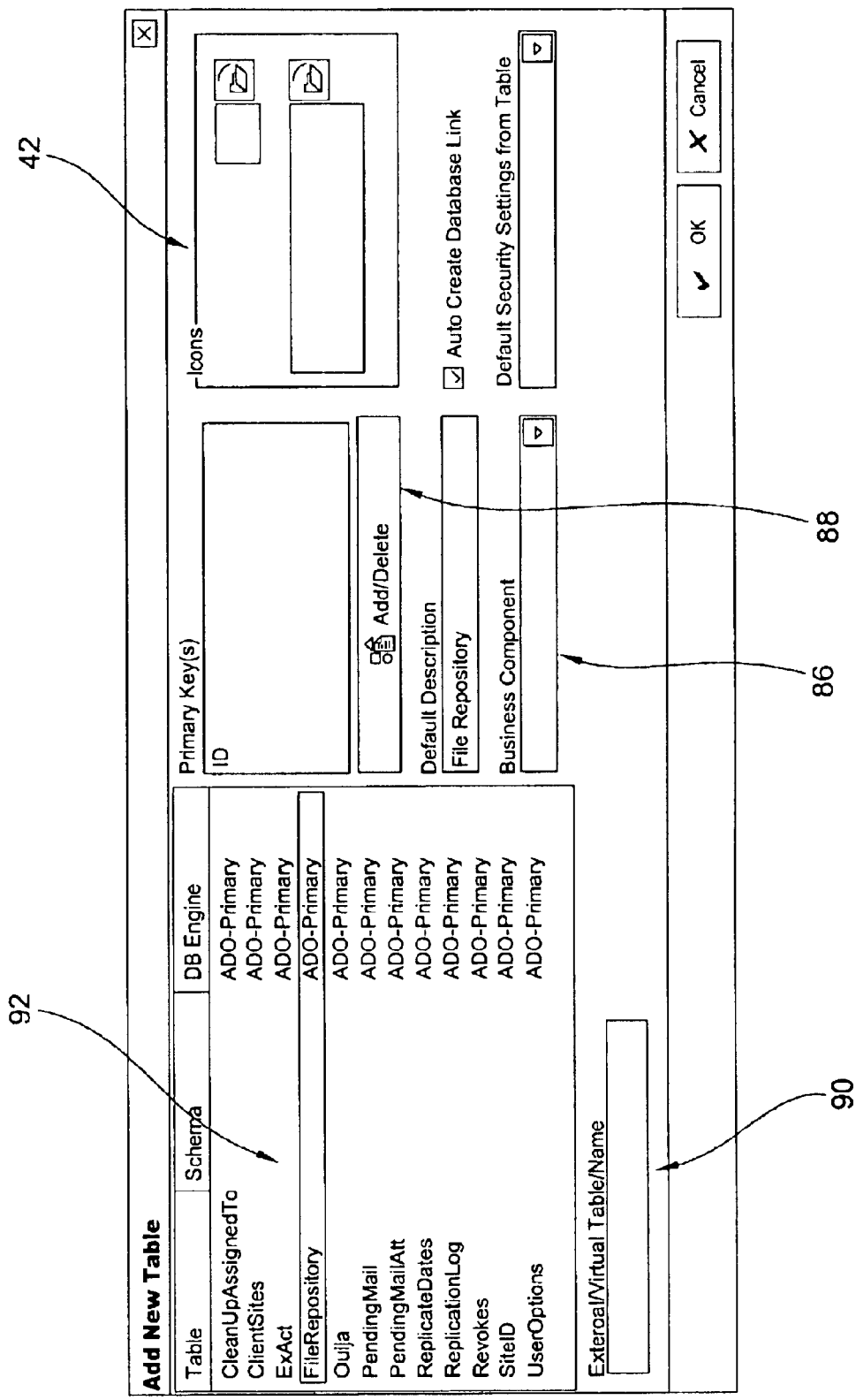
FIG. 15 is a view of a dialog box for creating, modifying, or deleting object data.

FIG. 15 is a view of a display 42 that can be generated by the application program of the invention to permit objects to be created, modified or deleted. The name of a new software component can be entered in the field 86 and the control element 88 activated via input devices 34, 36 to create a new software component for which privilege states can be tracked for different users or user groups. The field 90 can be used to enter the name of a new data table object and the control element 88 via the input devices 34, 36 to create a new data table object. Selection of an object in the displayed list 92 and activation of the control element 88 can be used to delete an object.

Figure 6B:
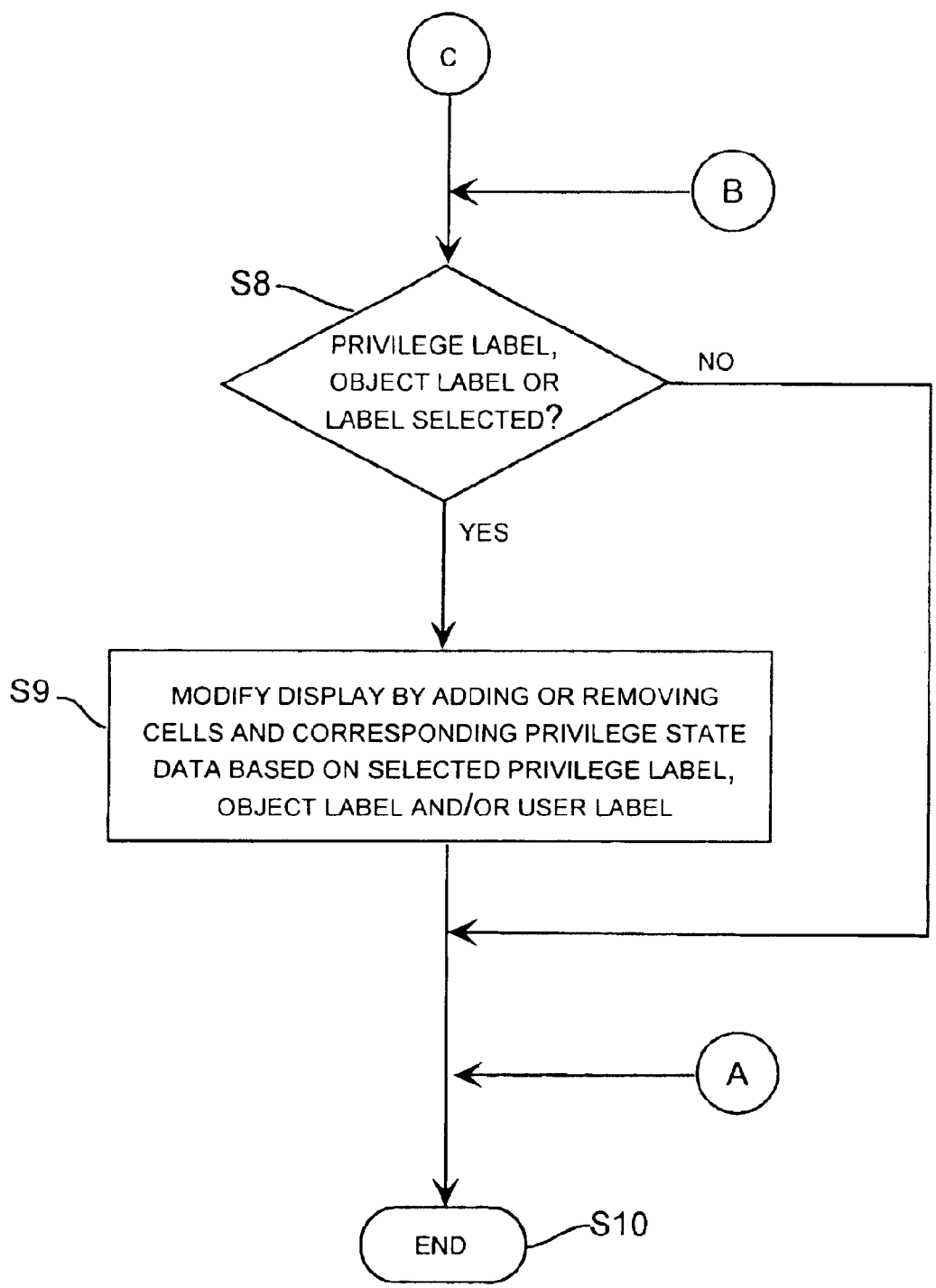

The application program embodied by the methods of FIGS. 5 and 6A and 6B can of course by stored on various storage media articles and loaded into a terminal device to generate a display of privilege state data for a network system in a three-dimensional view. Such storage media include random-access memory (RAM), read-only memory (ROM), CD-ROM, DVD, hard-storage-disk drives, tape drives, or any other storage device.

The application program described herein is not intended to enforce privileges of the network system 10. Rather this function is performed by a different application program that is not a part of the invention. However, it is desirable that the USER_TABLE, GROUP_TABLE, OBJECT_DEPENDENCY_TABLE, PRIVILEGE_DEPENDENCY_TABLE, and DISPLAY_TABLE have a data format that is compatible with the privilege enforcement application program.

The many features and advantages of the present invention are apparent from the detailed specification and thus, it is intended by the appended claims to cover all such features and advantages of the described methods, system and article that follow in the true spirit and scope of the invention. Further, since numerous modifications and changes will readily occur to those of ordinary skill in the art, it is not desired to limit the invention to the exact construction and operation illustrated and described. Accordingly, all suitable modifications and equivalents may be resorted to as falling within the spirit and scope of the invention.

What is claimed is:

1. A method comprising the steps of:
    a) on a user interface of a terminal device generating a display of privilege state data in an array of cells in a three-dimensional view on a terminal device, the privilege state data of the cells displayed in correspondence with privilege labels, object labels, and user labels arranged along respective transverse axes of the three-dimensional view;
    b) with the user interface of the terminal device, a user inputting privilege state data into at least one cell of the array using at least one privilege label, object label, and user label;
    c) determining the privilege data, object data, and user data corresponding to the cell in which the privilege state data is input in the step (b);
    d) storing the privilege state data in a memory in correspondence with respective privilege data, object data, and user data determined in step (c) for the cell in which the privilege state data was input in the step (b); and
    e) updating the display to include a privilege state symbol corresponding to the privilege state data input by the user in the step (b), based on the privilege state data stored in the memory in the step (d).

2. A method as claimed in claim 1 wherein the privilege state data includes data for "on", "inherited on", "public on", "off", "not set", and "disabled" states.

3. A method as claimed in claim 2 wherein the privilege state data toggles between the "on", "inherited on", "public on", "off", "not set", and "disabled" states with successive activations of an input device of the user interface.

4. A method as claimed in claim 1 further characterized by the steps of:
    f) with the user interface of the terminal device, selecting at least one of the privilege labels, object labels, or user labels; and
    g) modifying the display of the privilege state data by removing or adding cells to the three-dimensional view, based on the step (f).

5. A method as claimed in claim 1 wherein the user data identifies first and second user entities related by predetermined hierarchical relationship data and the privilege state data is input in the step (b) in at least one cell corresponding to first user entity, the method further characterized by the steps of:
    f) determining whether the second user entity inherits privilege state data from the first user entity, based on the hierarchical relationship data; and
    g) if the determination in the step (f) establishes that the second user entity inherits the privilege state data from the first user entity, storing the privilege state data input in the step (b) in correspondence with the user data for the second entity and the object data and privilege data for which the privilege state data was input in the step (b).

6. A method as claimed in claim 1 wherein the user data identifies dependencies between first and second object data related by predetermined dependency data, the method further characterized by the steps of:
    f) determining whether the second object data inherits privilege state data from the from the first object data, based on the predetermined dependency data; and
    g) if the determination in the step (f) establishes that the second object data inherits privilege state data from the first object data, storing the privilege state data input in the step (b) in correspondence with the user data for the second entity and the object data and privilege data for which the privilege state data was input in the step (b).

7. A method as claimed in claim 1 wherein the user data identifies dependencies between first and second privilege data related by predetermined dependency data, the method further characterized by the steps of:
    f) determining whether the second privilege data inherits privilege state data from the from the first privilege data, based on the predetermined dependency data; and
    g) if the determination in the step (f) establishes that the second privilege data inherits privilege state data from the first privilege data, storing the privilege state data input in the step (b) in correspondence with the user data for the second entity and the object data and privilege data for which the privilege state data was input in the step (b).

* * * * *